United States Patent
Johnston et al.

(10) Patent No.: US 6,619,232 B2
(45) Date of Patent: Sep. 16, 2003

(54) LOW MAINTENANCE LIVESTOCK WATERING SYSTEM

(76) Inventors: Hube Johnston, 5036 Lexington Rd., Paris, KY (US) 40361; Mindy M. Cook, 5036 Lexington Rd., Paris, KY (US) 40361

(*) Notice: Subject to any disclaimer, the term of this patent is extended or adjusted under 35 U.S.C. 154(b) by 0 days.

(21) Appl. No.: 09/963,117

(22) Filed: Sep. 21, 2001

(65) Prior Publication Data

US 2002/0078898 A1 Jun. 27, 2002

Related U.S. Application Data

(60) Provisional application No. 60/237,345, filed on Sep. 29, 2000.

(51) Int. Cl.$^7$ ............................................ A01K 7/02
(52) U.S. Cl. ........................................................ 119/73
(58) Field of Search ...................... 119/73, 78; 137/375, 137/334, 341, 340; 392/441, 444, 447

(56) References Cited

U.S. PATENT DOCUMENTS

| | | |
|---|---|---|
| 2,865,327 A | 12/1958 | Anderson |
| 3,044,445 A | 7/1962 | Terry et al. |
| 3,371,652 A | 3/1968 | Louks et al. |
| 4,100,885 A | 7/1978 | Kapplinger |
| 4,130,090 A | 12/1978 | Bohlmann |
| 4,298,022 A | 11/1981 | Walters |
| 4,329,940 A | 5/1982 | Humphries |
| 4,433,642 A | 2/1984 | Le Roy |
| 4,440,112 A | 4/1984 | Lilyerd |
| 4,584,966 A * | 4/1986 | Moore .......................... 119/73 |
| 4,646,687 A * | 3/1987 | Peterson et al. ............... 119/73 |
| 4,704,991 A * | 11/1987 | Moore .......................... 119/73 |
| 4,856,459 A * | 8/1989 | Wiseman et al. .............. 119/73 |
| 4,868,933 A | 9/1989 | Chen |
| 4,883,022 A * | 11/1989 | B. A. Barker ................. 119/73 |
| 4,930,572 A | 6/1990 | Doshier |
| 4,962,730 A | 10/1990 | Schafer |
| 4,986,221 A * | 1/1991 | Shaw ........................... 119/73 |
| 5,090,443 A | 2/1992 | Jacobsen |
| 5,169,291 A | 12/1992 | Zebuhr |
| 5,452,683 A * | 9/1995 | Poffenroth .................... 119/73 |

* cited by examiner

*Primary Examiner*—Peter M. Poon
*Assistant Examiner*—Son T. Nguyen

(57) ABSTRACT

A livestock watering system, designed with the user in mind, is disclosed. The present invention is comprised of an insulated removable water reservoir whereby said reservoir provides easy access to all parts of the invention. This facilitates the ease of cleaning and maintenance. Moreover, this insulated design is heated by a heating element that heats the air below the removable reservoir, to prevent freezing. The reservoir automatically refills by the use of a water level control device and is easily drained by pulling a plug, through which a stainless steel eyebolt has been placed. The use of wing nuts and bolts allows for replacement or service of individual components of the invention without the need for tools. Most all parts are preferably made of plastic or stainless steel to prevent rust and corrosion. The main objective of this design is to promote the ease of use and maintenance.

1 Claim, 3 Drawing Sheets

LOW MAINTENANCE LIVESTOCK WATERING SYSTEM

This application is based on and claims priority from U.S. Provisional Patent Application Serial No. 60/237,345, Hube Johnston & Mindy M. Cook, filed Sep. 29, 2000.

FIELD OF THE INVENTION

This invention relates to a livestock watering device and specifically to a low maintenance, durable device for the watering of livestock.

BACKGROUND OF THE INVENTION

Farms today are run and owned by a wide variety of people having a broad range of available time and fanning experience. When designing a device to be regularly used and serviced on a farm, it is desirable to have something that is easy to take care of and durable.

It would not be convenient to have to carry buckets of water out to fill the drinking reservoirs and it certainly would be desirable to be able to take only the reservoir away from the system to clean it, instead of having to transport the entire apparatus. By employing an automatic watering device, the user hopes to relieve some of the burden that accompanies everyday tasks on a farm. Therefore, when watering animals in a pasture it is desirable to have a device that is automatic, durable and easy to service.

The concept of having an automatically refilling watering device is well known in the art. Various methods and devices have been employed to accomplish this goal. See, for example, U.S. Pat. No. 3,044,445, issued to Terry et al, on Jul. 17, 1962. However, the water level control mechanisms of the devices that have been previously developed either protrude into the trough area, taking away from the volume of available drinking water, or are permanently affixed to the device which they service.

Allowing the water level control device to protrude into the trough takes away from the amount of area that provides actual drinking water to the animals. Also, allowing the water level control valve to protrude from the reservoir presents an opportunity for damage to the valve by the animals.

By utilizing a built-in recessed sump, the present invention protects the valve from damage by eliminating the possibility of an animal accidentally hitting it with a hoof. Furthermore, by recessing the sump, it does not detract from the area which is to be used to hold the water.

Moreover, a permanently affixed water level control device can be costly to replace. By using a valve that is attached by the use of a thread system comparable to that found on a garden hose, the valve can be removed without tools and easily replaced.

It is also common to have a heated and/or insulated water supply to keep the water from freezing in the winter. For example, some of the prior art uses gas burners which are placed under the water reservoir. Other art utilizes hot gas that is bubbled through the water supply. The present invention uses a heating element that is powered by an electrical outlet and is separated entirely from the water reservoir. By separating the heating element, the chance of electric shock to the animals and the farmers is greatly diminished. Furthermore, the heating element, which can easily be removed, results in much lower maintenance.

It is not common in the prior art to utilize a removable water reservoir. Such a reservoir makes cleaning and maintenance simple. The present invention utilizes a durable plastic water reservoir that can be removed without the use of tools. By using plastic, the reservoir becomes lighter and more sanitary. By removing the easily carried reservoir, the present system can be easily serviced.

In general, the prior art devices are generally hard to clean and hard to take apart and service. This is especially true when there are two or more chambers that hold water and when the heating element is inside the water chamber. Moreover, because of metal and/or concrete construction, prior art devices are frequently heavy and cumbersome. This makes cleaning a difficult task. Furthermore, if a part needs to be changed the entire unit would have to be taken apart and maybe even taken off of the premises.

In view of the foregoing limitations and shortcomings of the prior art, as well as other disadvantages not specifically listed above, it should be apparent that there exists a need for a livestock watering system that is durable, yet easy to utilize, maintain and clean.

It is therefore a primary object of the present invention to provide a watering system for livestock that is easy to use, clean, service and that is durable.

It is a further object of this device to provide a livestock watering system that automatically controls the level of water contained within and is designed to resist the wear and tear of normal to moderately heavy usage.

SUMMARY OF THE INVENTION

Briefly described, these and other objects are accomplished according to the present invention by providing a livestock watering system having a removable water reservoir that is insulated and heated. The water reservoir is constructed so that it has a built-in sump that houses a water level control device and a drain, which are thereby protected from damage that may be caused by animal hooves. The water level control device is coupled to one end of a coil water hose. The other end of the coil water hose is coupled to a water shut-off valve. The water shut-off valve is coupled to a water supply.

The water reservoir is surrounded by an insulated casing which may be buried (wholly or partially) in the ground for stability. Between the water reservoir and the ground there exists a heating element that heats the air below the water, thereby preventing the water from freezing in the winter.

All parts are easily accessed by simply lifting and removing the water reservoir from the outside casing, and all parts can be changed without the aid of tools.

Additional benefits and advantages of the present invention will become apparent to one skilled in the art to which the present invention relates from the subsequent description of the preferred embodiment in the appended claims, taken in conjunction with the accompanying drawings.

DESCRIPTION OF THE PREFERRED EMBODIMENT

Figure 1:
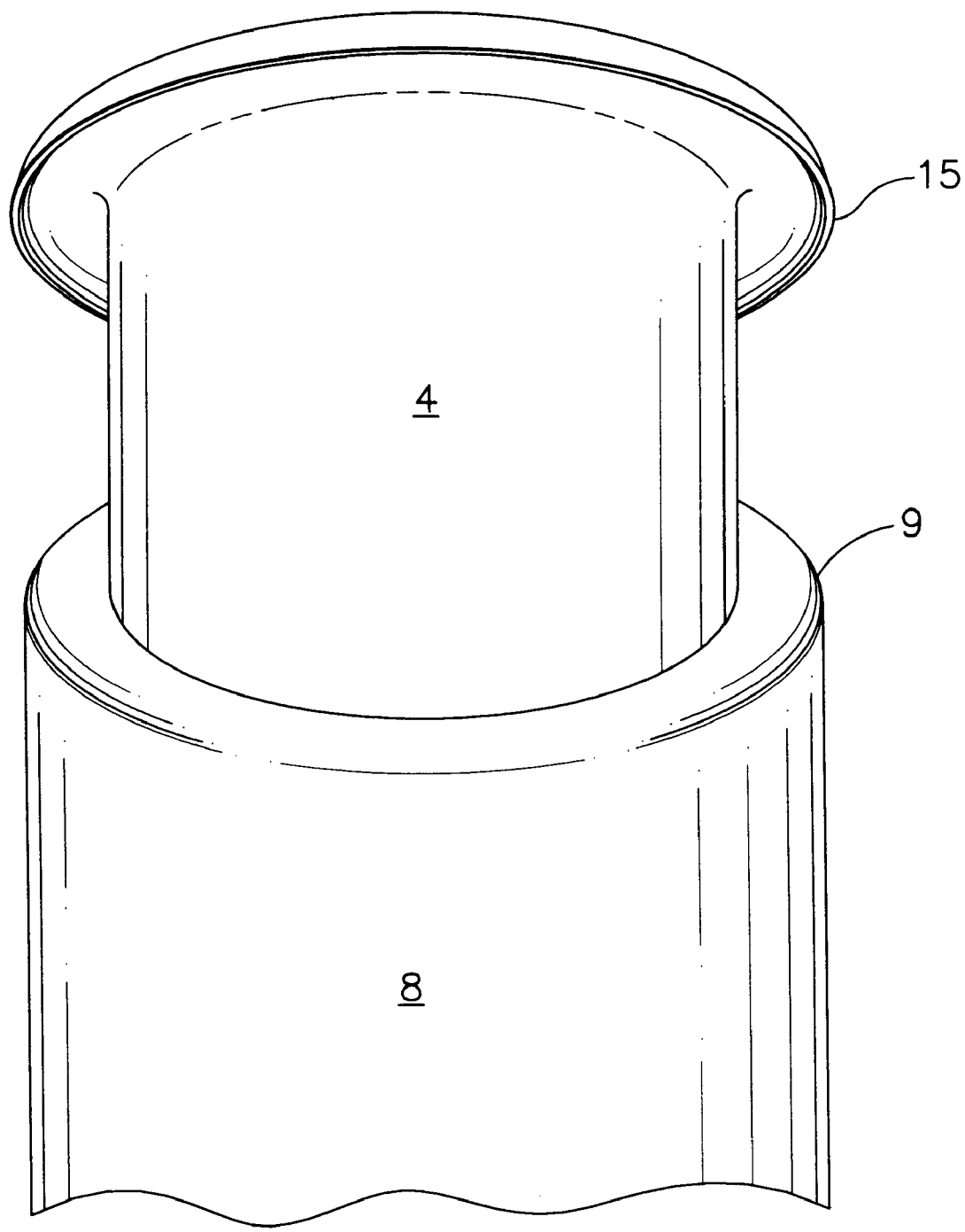
FIG. 1 is an outside view of the device reflecting both the inner removable water reservoir and the insulated casing.
Figure 2:
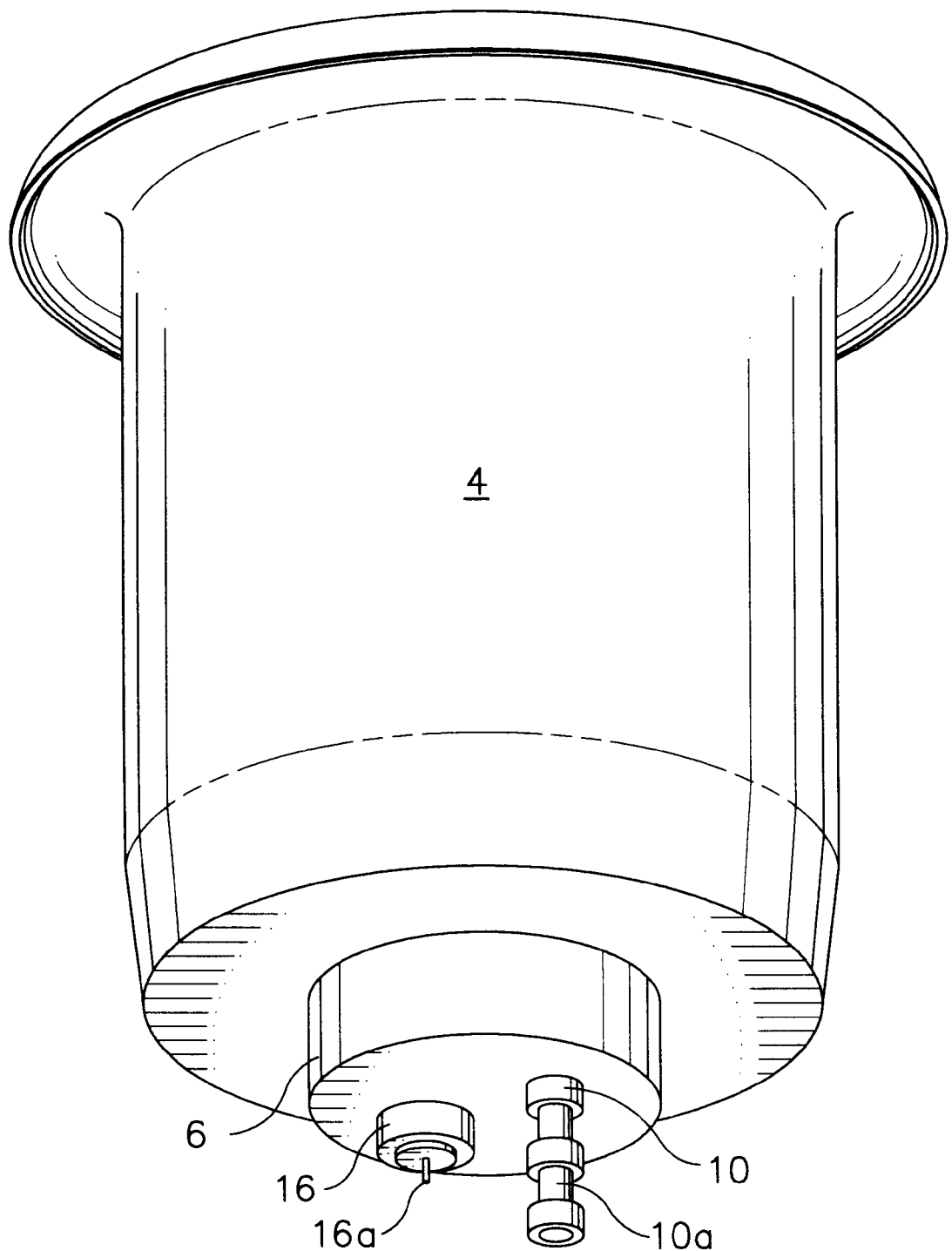
FIG. 2 is a perspective view of the present invention showing the bottom of the removable water reservoir.
Figure 3:
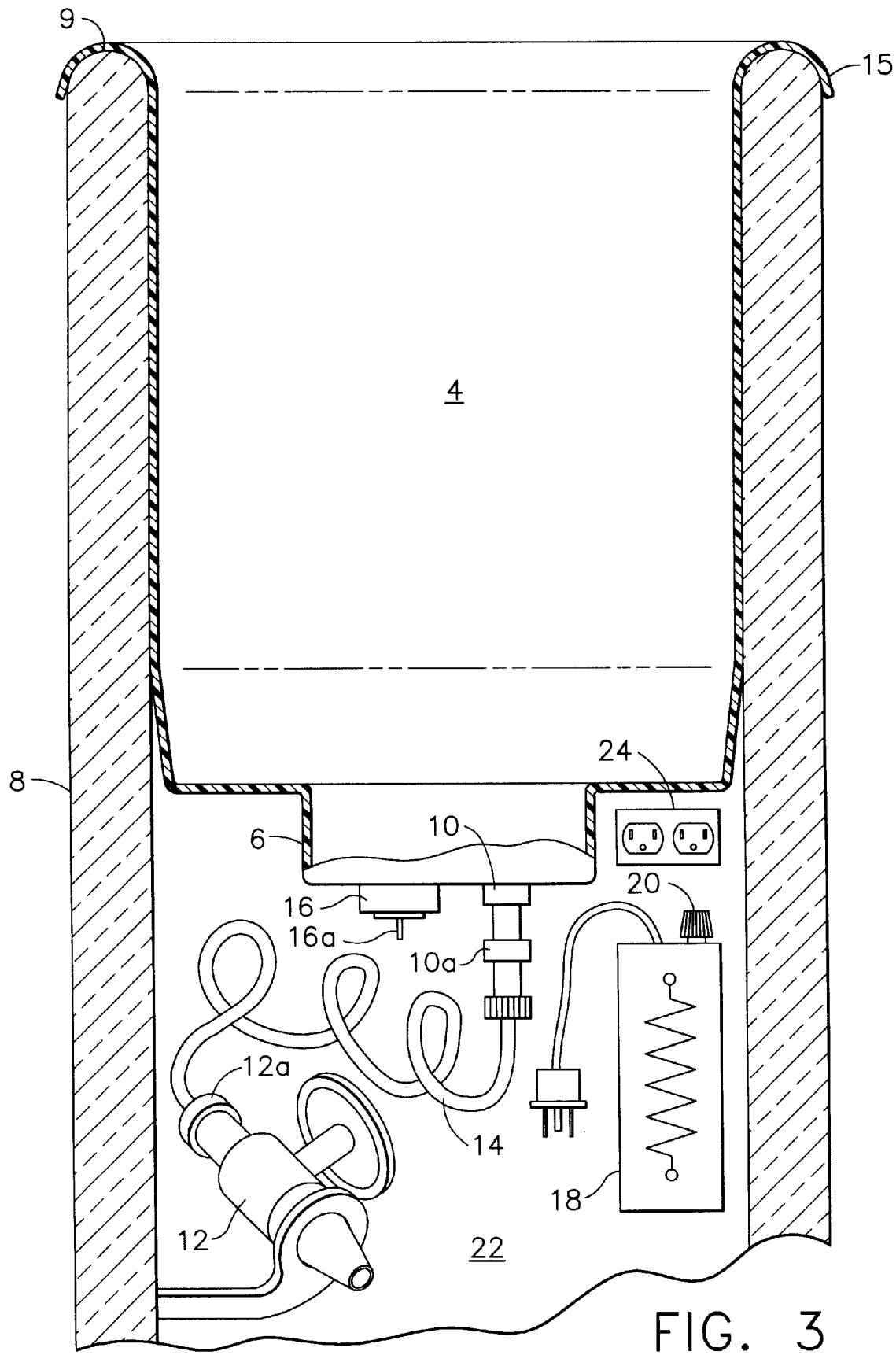
FIG. 3 is a cross sectional view of the present invention (taken vertically through FIG. 1) showing the construction and inner workings of the present invention.

Referring now in detail to the drawings, there is shown in FIG. 1 the device of the present invention. The device is comprised of a removable water reservoir (4) and an insulated casing (8). The casing (8) provides support for the water reservoir and a protective casing for the mechanics of the device. The water reservoir fits within the casing. The water reservoir has a lip (15) around its circumference which rests on the top of the casing (9). As shown in FIG. 3, the casing contains heavy pour in Styrofoam insulation which helps keep water from freezing in the winter and keeps the water relatively cool in the summer. The casing can be made from any strong, weather resistant insulating material. This casing is buried, at least partially, in the ground in order to provide stability for the device. As shown in FIG. 3, the upper lip (15) of the water reservoir naturally rests on the top edge (9) of the outside casing. Between the bottom of the water reservoir and the ground is enough room to house the inner workings of the invention.

The casing (8) may be buried at various depths depending on the needs of the user. The casing (8) is preferably constructed of, but not limited to plastic, in order to prevent corrosion and to increase the useful life of the invention.

The water reservoir (4) is constructed with a built-in, recessed sump (6), which houses both the water level control device (10) and the drain (16). The recessed sump (6) protects the water level control device (10) and the drain (16) from inadvertent damage from animal hooves.

The drain (16) is preferably made of rubber with a stainless steel eye-hook (16a) through the center of the drain. In this manner, the drain may be pulled using a long rod which grabs the top of the eye hook in the drain below. The water then drains onto 2–3 feet of rock and soil below the device, and is naturally dissipated into the soil.

The water level control device (10) can either be a traditional float valve, or preferably, a pressure sensitive valve which adjusts the water level by sensing the pressure per square inch of the water present in the water reservoir. This device (10) can be easily changed by screwing it in and out, utilizing a thread system much like that of a garden hose. These valves are preferably made of, but not limited to, plastic. Like most other parts in the invention, the valves are used with the intent to prevent rust or corrosion and increase the durability of the device.

Beneath the water reservoir, the water level control device is attached to a coil water hose (14) by using a coupler (10a) which slides on and off easily. The water hose may be of any length sufficient to supply water from a water supply, for example a water main, to the water reservoir.

The opposite end of the coil water hose (14) is connected to a shut-off valve (12) using a second coupler (12a). Shut-off valve (12) is preferably constructed of, but not limited to, a brass valve with a stainless steel ball, providing durability and quality of construction.

Furthermore, as depicted in FIG. 3, the shut-off valve (12) is mounted onto the inner surface (22) of the outside casing. This part is not easily removed, as there is no need to do so.

As shown in FIG. 3, a heating element (18) (for example, a 500 watt resistance heating element) is mounted on the inside surface of the casing (22) using in a conventional method, for example by wing nuts and stainless steel bolts. By using wing nuts the heating element (18) may be easily removed and serviced or replaced without the employ of tools.

Atop the heating element (18) sits an adjustable thermostat (20). The thermostat adjusts the temperature of the air below the water reservoir depending on the needs of the user. The air is heated, instead of directly heating the water, so that there is not the danger of electrocution that comes from placing the heating element in the water reservoir.

The heating element is then plugged into a multi-purpose electrical outlet (24) which is also affixed to the inside surface of the casing (22), for example, with wing nuts and bolts. This outlet may be used for additional purposes, as it is easily accessed by lifting the water reservoir. Both the heating element and the electrical outlet are water resistant and are grounded.

The invention is serviced by running both electrical and water lines underneath the ground and up to the shut-off valve and the electrical outlet. In this manner both lines may be controlled from remote locations without having to go into the field. Also, by burying these lines they are protected from the weather and from animals or other machinery that might be traveling over the ground.

We claim:

1. A livestock watering system, buried at least partially in the ground, consisting essentially of:

a) a removable circular water reservoir, having a circumferential lip and a built-in recessed sump where said sump has a bottom with a first opening and a second opening;

b) an insulated, circular casing having a top edge and an inside surface; wherein said casing contains heavy pour in Styrofoam insulation;

c) wherein said water reservoir rests within said casing, by resting the circumferential lip of the water reservoir on the top edge of the casing, and where said water reservoir and casing are constructed such that when said water reservoir is placed within said casing a void space for indirect heating of said void space exists beneath said water reservoir;

d) a water level control device wherein said water level control device is attached to the first opening of said bottom of said sump;

e) a water shut-off valve, wherein said water shut-off valve is attached to the inside surface of said casing;

f) a water supply, wherein said water supply is coupled to said water shut-off valve;

g) a removable plug, wherein said removable plug is positioned in said second opening in said bottom of said sump for passive drainage and natural dissipation of water;

h) a removable heating element with adjustable thermostat, wherein said heating element is attached to said inside surface of said casing;

i) a multi-purpose electrical outlet, wherein said multi-purpose electrical outlet is connected to inside of the casing and is also connected to said heating element; and i) a remote control unit for control of the water supply and the multi-purpose electrical outlet.

* * * * *